(12) United States Patent
Pierson

(10) Patent No.: US 9,930,976 B2
(45) Date of Patent: *Apr. 3, 2018

(54) MAGNETIC MOUNTING SYSTEM AND METHOD

(71) Applicant: Leslie Pierson, Seattle, WA (US)

(72) Inventor: Leslie Pierson, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/644,566

(22) Filed: Jul. 7, 2017

(65) Prior Publication Data

US 2017/0303708 A1    Oct. 26, 2017

Related U.S. Application Data

(63) Continuation of application No. 15/060,432, filed on Mar. 3, 2016, now Pat. No. 9,730,534.

(60) Provisional application No. 62/129,143, filed on Mar. 6, 2015, provisional application No. 62/186,150, filed on Jun. 29, 2015.

(51) Int. Cl.
| | |
|---|---|
| *A47F 1/14* | (2006.01) |
| *A47G 1/17* | (2006.01) |
| *F16B 47/00* | (2006.01) |
| *F16B 1/00* | (2006.01) |

(52) U.S. Cl.
CPC .............. *A47G 1/17* (2013.01); *A47G 1/175* (2013.01); *F16B 1/00* (2013.01); *F16B 47/003* (2013.01); *F16B 2001/0035* (2013.01)

(58) Field of Classification Search
None
See application file for complete search history.

(56) References Cited

U.S. PATENT DOCUMENTS

| | | | |
|---|---|---|---|
| 2,508,894 A | 5/1950 | Schloer | |
| 3,239,178 A * | 3/1966 | Pompa | F16B 47/003 211/1 |
| 3,434,651 A | 3/1969 | Stec | |
| 3,472,242 A | 10/1969 | Demner | |
| 3,604,673 A * | 9/1971 | Klein | A47G 1/168 248/467 |
| 3,827,020 A * | 7/1974 | Okamoto | B42F 15/066 248/309.4 |
| D234,026 S | 12/1974 | Winter | |
| 3,885,336 A * | 5/1975 | Olsen | A47G 1/06 40/711 |
| 4,058,335 A * | 11/1977 | Abe | E05C 19/16 248/206.5 |
| 4,209,126 A | 6/1980 | Elias | |
| 4,211,382 A * | 7/1980 | Bonfils | A47G 1/168 248/467 |

(Continued)

*Primary Examiner* — Monica E Millner
(74) *Attorney, Agent, or Firm* — Davis Wright Tremaine, LLP

(57) ABSTRACT

The disclosure includes in one aspect a mounting sticker comprising a non-adhesive front side defined by a planar sticker body and a rear side defined by the planar sticker body and including a planar magnetically receptive member disposed thereon with the magnetically receptive member completely peripherally surrounded by a portion of the sticker body, at least a portion of the sticker body defining the rear side comprising an adhesive. The sticker body can define a teardrop shape having a circular head portion with a peeling tip extending from the head portion and terminating at a point defined by an acute angle or can be circular.

20 Claims, 11 Drawing Sheets

(56) References Cited

U.S. PATENT DOCUMENTS

| | | | |
|---|---|---|---|
| D275,340 S | 9/1984 | Dunbar | |
| 4,523,689 A | 6/1985 | Laub | |
| 4,605,292 A * | 8/1986 | McIntosh | A47G 1/00 248/205.3 |
| 4,678,150 A * | 7/1987 | Newman | A47G 1/17 248/205.3 |
| 4,817,320 A * | 4/1989 | Fraynd | G09F 7/04 40/621 |
| 4,852,284 A * | 8/1989 | Faggiano | G09F 7/00 40/488 |
| 4,875,654 A * | 10/1989 | Chandonnet | A47G 1/17 248/206.5 |
| 5,039,047 A * | 8/1991 | Pitzo | A47G 1/17 248/206.5 |
| 5,269,083 A * | 12/1993 | Vampatella | A47G 1/065 248/206.5 |
| 5,746,329 A * | 5/1998 | Rondeau | A47G 1/17 211/123 |
| D401,087 S | 11/1998 | Hellwig et al. | |
| 5,918,400 A * | 7/1999 | Schonberger | A47G 1/0633 40/711 |
| D447,655 S | 9/2001 | Petri | |
| 6,572,945 B2 * | 6/2003 | Bries | C09J 7/02 24/306 |
| 6,578,723 B1 | 6/2003 | Tyner | |
| D482,412 S | 11/2003 | Manville | |
| 6,889,458 B2 * | 5/2005 | Copley | A47G 1/0616 40/600 |
| 7,225,568 B1 * | 6/2007 | Rizzo | G09F 7/04 40/124.04 |
| D652,053 S | 1/2012 | Impas et al. | |
| 8,434,730 B2 * | 5/2013 | Ahlstrom | A47G 1/168 248/206.5 |
| 8,590,232 B2 * | 11/2013 | Roche | B32B 3/06 24/303 |
| 8,764,323 B2 * | 7/2014 | Keeton | B41J 2/32 347/221 |
| D755,301 S | 5/2016 | Knapp | |
| 9,374,927 B2 * | 6/2016 | Byeon | G02F 1/133308 |
| 2011/0042542 A1 * | 2/2011 | Russo | A47G 1/17 248/467 |
| 2013/0146738 A1 * | 6/2013 | Jaeger | A47G 1/17 248/467 |
| 2014/0061409 A1 * | 3/2014 | Mayhew, Jr. | F16M 13/02 248/206.5 |
| 2014/0263908 A1 * | 9/2014 | Franklin | F16M 13/02 248/309.4 |
| 2016/0255970 A1 | 9/2016 | Pierson | |

* cited by examiner

MAGNETIC MOUNTING SYSTEM AND METHOD

CROSS-REFERENCE TO RELATED APPLICATIONS

This application is a continuation of U.S. non-provisional application Ser. No. 15/060,432 filed Mar. 3, 2016, which claims the benefit of U.S. Provisional Application No. 62/129,143 filed Mar. 6, 2015, and claims the benefit of U.S. Provisional Application No. 62/186,150, filed Jun. 29, 2015, which applications are hereby incorporated herein by reference in their entirety and for all purposes.

BACKGROUND

Mounting items to walls (and other surfaces) typically includes pins or nails that are driven into the wall. Such mounting methods can be undesirable because they make permanent holes in walls and can be difficult to remove. Moreover, using pins or nails often also requires holes being made in them item being mounted. Such mounting methods are also time consuming and require great precision. For example, where a painting must be hung at a certain position and be level, a user must make careful measurements to ensure that pins or nails are driven in the correct locations(s). Otherwise, new holes must be created in the wall to correct any positioning or leveling issues.

Because the use of pins or nails damages walls and items being hung, this can create an undesirable disincentive to change or rotate art, pictures or other items that are hung on display. In other words, because the process of removing items and hanging new ones is both time consuming and damaging to walls, many users will forego changing hung items.

Alternative methods can include tape or the like, which can be used to couple items to a wall. Although such methods may not generate holes, such tape can still harm the wall and/or the item being mounted to it during dismounting of the item from the wall. Moreover such tape is not configured to be reusable. Accordingly, such methods suffer from the same deficiencies discussed above.

In view of the foregoing, a need exists for an improved magnetic mounting system and method for hanging items on walls and other surfaces in an effort to overcome the aforementioned obstacles and deficiencies of conventional hanging systems and methods.

BRIEF DESCRIPTION OF THE DRAWINGS

FIG. 1a illustrates a front side of a mounting sticker in accordance with an embodiment.

FIG. 1b illustrates a rear side of the mounting sticker of FIG. 1a.

FIG. 1c illustrates a side view of the mounting sticker of FIGS. 1a and 1b.

Figure 1:
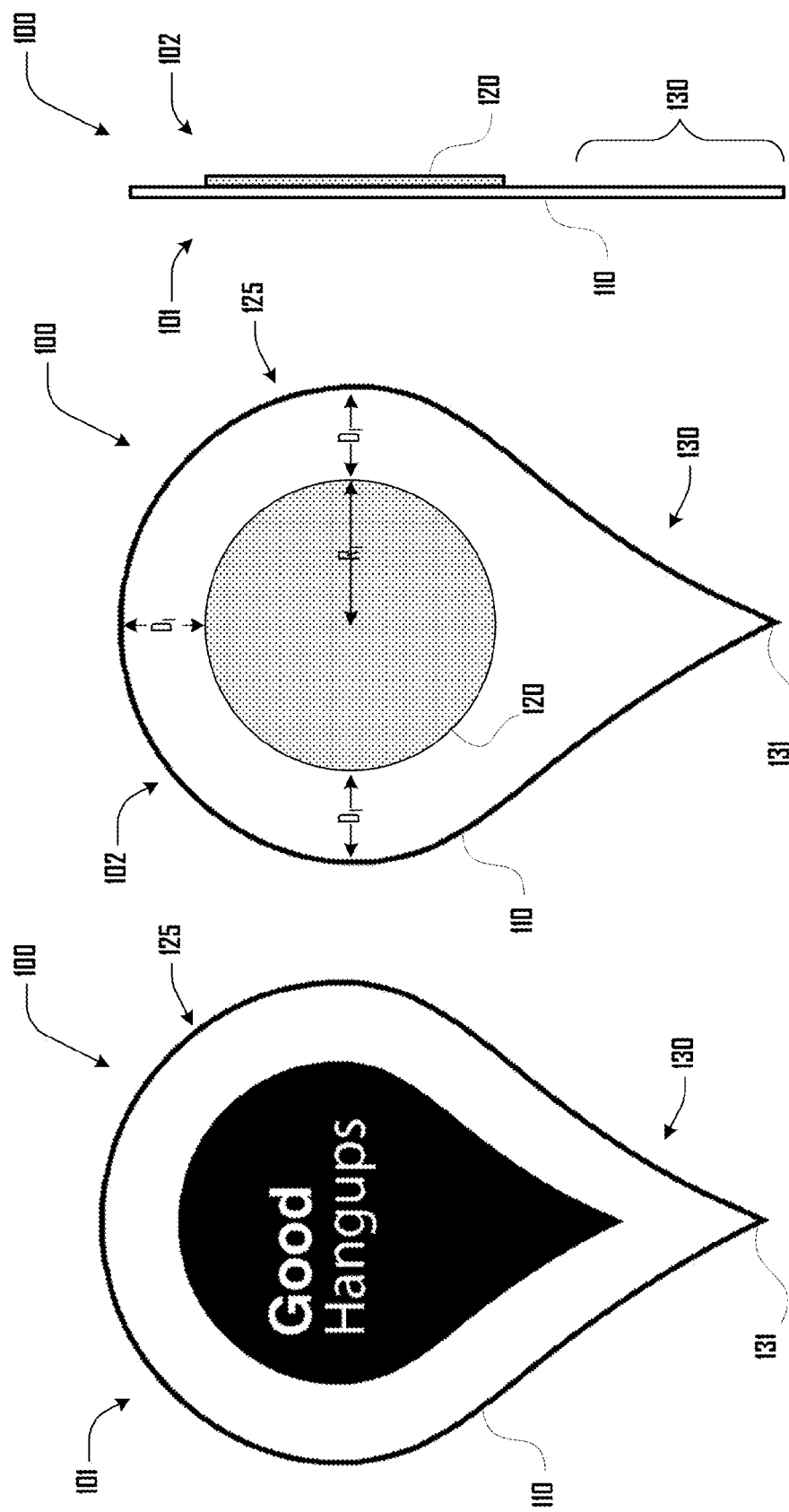

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Turning to FIGS. 1a-c, a mounting sticker 100 is shown as comprising a front and rear side 101, 102 including a planar sticker body 110 and a planar magnetically receptive member 120 that is coupled to the rear side 102 of the sticker body 110. In other words, the front side 101 is defined by the body 110 and the rear side 102 is defined by a portion of the body 110 and a portion of the magnetically receptive member 120.

The sticker body 110 comprises a head portion 125 and a peeling tip 130, which can collectively define a teardrop shape as shown in this example embodiment. The head portion 125 can be generally circular with the peeling tip 130 extending from the head portion 120 and terminating at a point 131. The point 131 can be defined by an acute angle of any suitable size including or within a range of any of 85°, 80°, 70°, 60°, 50°, 40°, 30°, 20°, 10°, or the like. As discussed in more detail herein, in various embodiments, the peeling tip 130 can be used for removing the mounting sticker 100 from a surface that the mounting sticker 100 is stuck to.

The magnetically receptive member 120 can comprise a magnetically receptive planar circular disc that is coupled to the sticker body 110 on the rear side 102 on the head portion 125. In various embodiments, the magnetically receptive member 120 can be completely peripherally surrounded by a portion of the sticker body 110 as shown in FIG. 1b. In some embodiments, it can be desirable for a radius of the magnetically receptive member 120 to correspond to, and be substantially equidistance from, a circular edge portion of the head portion 125 of the sticker body 110 as illustrated in FIG. 1b by distance $D_1$.

In some embodiments, a radius $R_1$ of the magnetically receptive member 120 can be greater than a consistent portion distance $D_1$. Such a configuration can provide a desirable balance between stickiness of the mounting sticker 100 and removability of the mounting sticker 100 along with the magnetic capability of the magnetic member 120. Accordingly, in some embodiments the radius $R_1$ and distance $D_1$ can be carefully chosen based on desired characteristics of the mounting sticker 100 as described herein. In further embodiments, the radius $R_1$ of the magnetically receptive member 120 can be less than or equal to a consistent portion distance $D_1$.

The magnetically receptive member 120 can comprise various suitable materials and be magnetically receptive in various suitable ways. For example, the magnetically receptive member 120 can comprise steel, iron, nickel, cobalt, manganese, neodymium, and the like. In other words, the magnetically receptive member 120 can comprise any suitable material that is attracted by a magnet. The magnetically receptive member 120 can be magnetic in some embodiments, but in various preferred embodiments, the magnetically receptive member 120 is non-magnetic.

The sticker body 110 can comprise various suitable materials, including paper, fabric, plastic, metal, or the like. In various preferred embodiments, the sticker body 110 comprises a durable fabric that is flexible and resists tearing when a user removes the mounting sticker 100 from a surface that the mounting sticker 100 is stuck to.

As discussed in more detail herein, the mounting sticker 100 can be coupled or stuck to various suitable surfaces via the rear side 102. Accordingly, in various embodiments, a portion of the rear side 102 can comprise an adhesive or otherwise be configured to stick to various surfaces. In one preferred embodiment, the entire exposed sticker body 110 on the rear side 102 can comprise an adhesive with the magnetically receptive member 120 being without adhesive or otherwise configured to not stick to various surfaces. In another embodiment, a portion of the exposed sticker body 110 on the rear side 102 can comprise an adhesive with the magnetically receptive member 120 being without adhesive or otherwise configured to not stick to various surfaces. For example, in one embodiment an end portion of the peeling tip 130 can be without an adhesive with other portions of the sticker body 110 comprising an adhesive. In further embodiments, a portion of the magnetically receptive member 120 can comprise an adhesive.

Portions of the rear side 102 can be configured to adhere to, stick to or otherwise couple with various surfaces in various desirable ways. For example, an adhesive such as a glue, gum, wax, rubber, acrylic, silicone, epoxy, polyurethane, or the like can be disposed on the rear side 102. In one preferred embodiment, an adhesive can be configured to not strip off portions of a surface that the mounting sticker 100 is coupled with when the mounting sticker 100 is removed (e.g., strip paint off a painted wall).

Additionally, in some preferred embodiments, an adhesive can be selected for reusability. For example, an adhesive can be selected for allowing the mounting sticker 100 to be stuck to and removed from surfaces many times without losing desired holding capacity. In other words, the adhesive for the mounting sticker 100 can be selected such that the mounting sticker will not effectively be permanently coupled to surfaces that the mounting sticker 100 is applied to. Moreover, the adhesive and sticker body 110 can be configured such that the mounting sticker 100 can be stuck to a wall and removed from a wall a plurality of times, without degrading the integrity of the sticker body 110 and the adhesive properties of the mounting sticker 100. In other words, the sticker body 110 will not tear or break and the adhesive will not separate from the sticker body 110 or the mounting sticker 110 will not lose the ability to be reused after being removed from a surface.

Additionally, adhesive can be selected based on its stability of adhesive characteristics. For example, some adhesives can become more sticky or permanent over time, and accordingly, adhesives can be selected such that a mounting sticker 100 remains removable and reusable regardless of whether the mounting sticker 100 is removed from a surface within a number of minutes, hours, days, weeks, months, years, or the like.

Although various example embodiments discussed herein relate to mounting stickers 100 comprising an adhesive, further embodiments can be configured to stick to various surfaces without an adhesive. For example, a mounting sticker can comprise a surface configured for static cling coupling, Velcro coupling, gecko coupling technology (e.g., a Gecko Setal Array), or the like. Additionally, certain portions of the mounting sticker 100 can be configured without an adhesive or sticking capability, which can include the rear side 102 face of the magnetically receptive member 120 and/or the front side 101.

Figure 2:
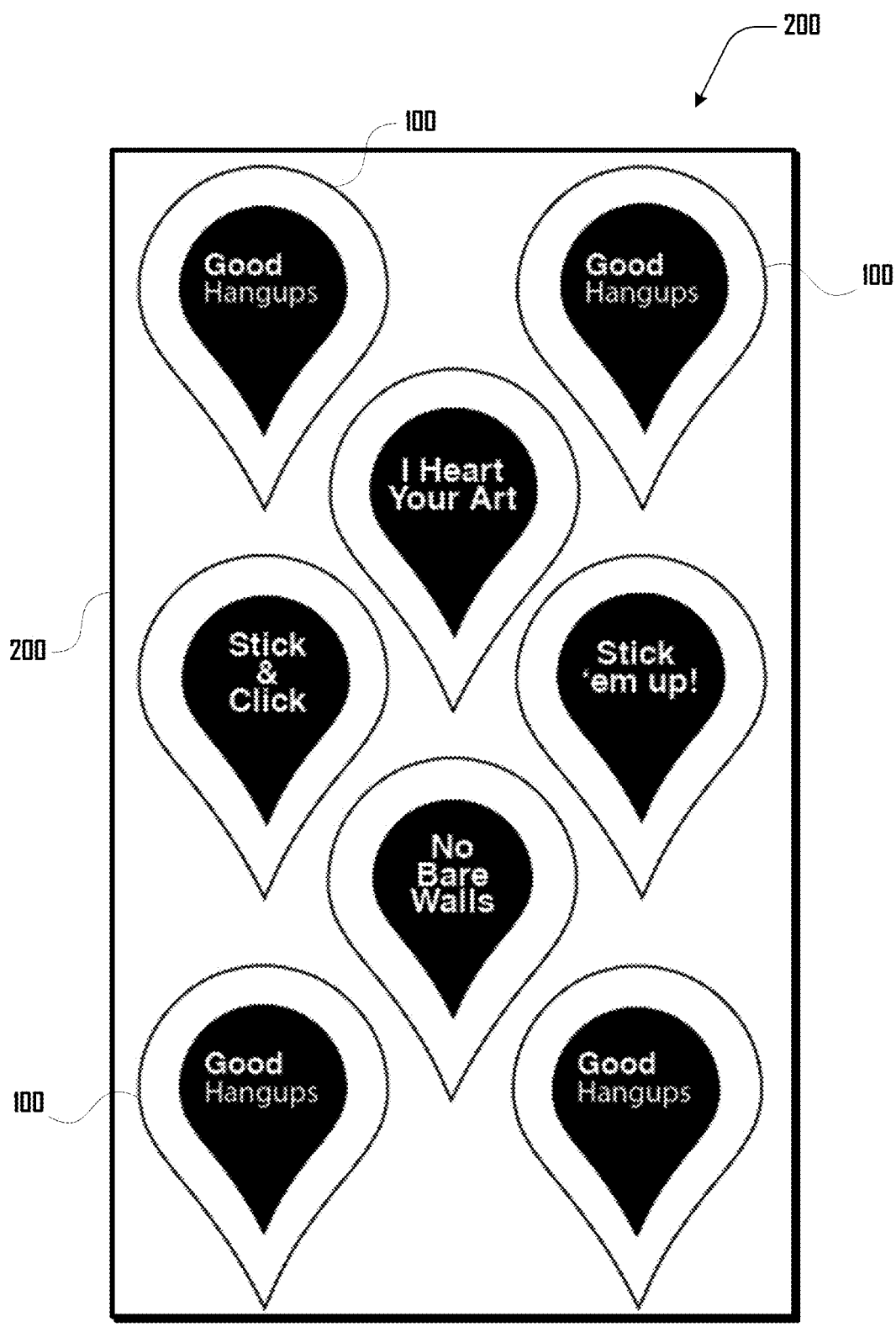
FIG. 2 illustrates a plurality of mounting stickers coupled to a sticker sheet in accordance with an embodiment.

Various portions of the mounting sticker 100 can comprise any suitable graphic, logo, lettering, design, or the like. For example, FIG. 1a and FIG. 2 illustrate graphics that include text that reads "Good Hangups" on a black background, but this should not be construed to be limiting on the wide variety of possible configurations that are possible and within the scope and spirit of the present disclosure. In some embodiments, such graphics, logos, lettering, designs, or the like can be absent.

In some embodiments, mounting stickers 100 can be provided as a kit that comprises a plurality of mounting stickers 100 coupled to a sticker sheet 200. Such a kit can further include magnets as described in more detail herein. Providing a plurality of mounting stickers 100 coupled to a sticker sheet 200 can be desirable because unused mounting stickers 100 can remain on the sticker sheet 200 or be returned to the sticker sheet 200 when peeled from a surface after use.

Figure 3A:
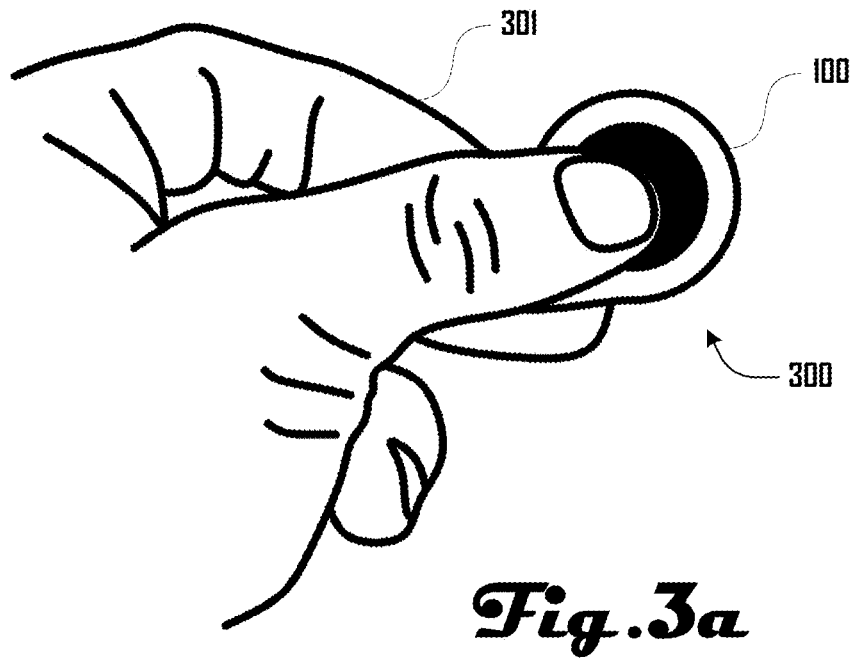
FIG. 3a is a perspective view of a user coupling a mounting sticker to a wall.
Figure 3B:
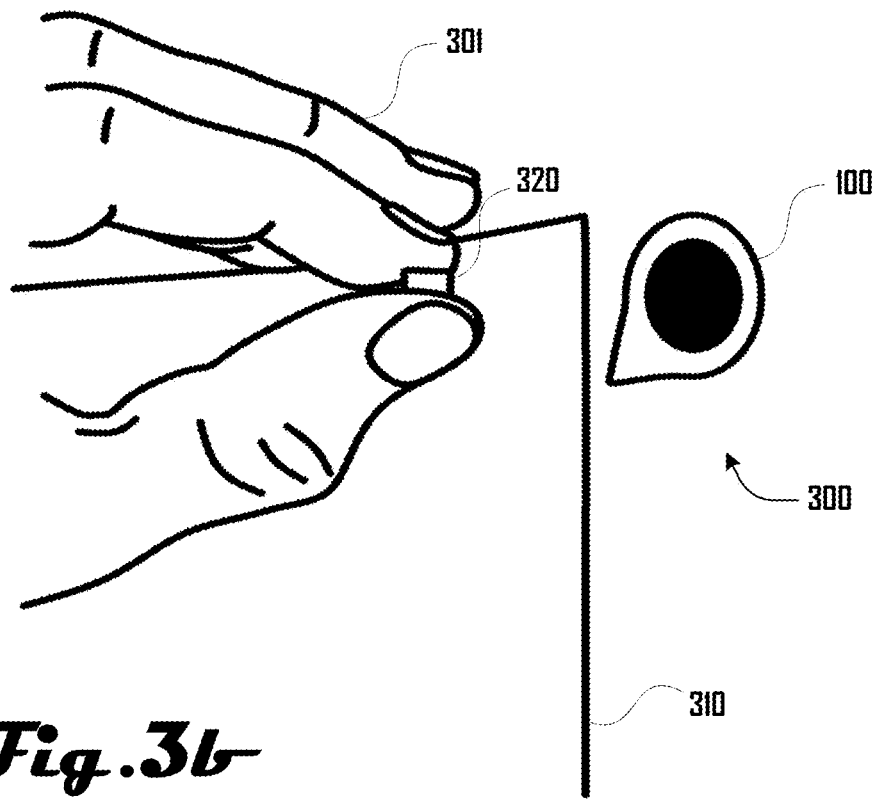
FIG. 3b is a perspective view of a user mounting a hanging item to a wall by placing a magnet on the mounting sticker with the hanging item therebetween.

FIGS. 3a and 3b illustrate an example method of using a mounting sticker to couple a hanging item 310 to a wall 300. As illustrated in FIG. 3a, a user 301 can press a mounting sticker 100 against a wall 300 such that it sticks to or otherwise adheres to the wall. As shown in FIG. 3b the user 301 can position a hanging item 310 over the mounting sticker 100 and further couple a magnet 320 to the mounting sticker 100 over the hanging item 310 such that the hanging item 310 is held on the wall between the magnet 320 and mounting sticker 100 due to magnetic attraction between the magnet 120 and the magnetically receptive member 120 of the mounting sticker 100.

Figure 4:
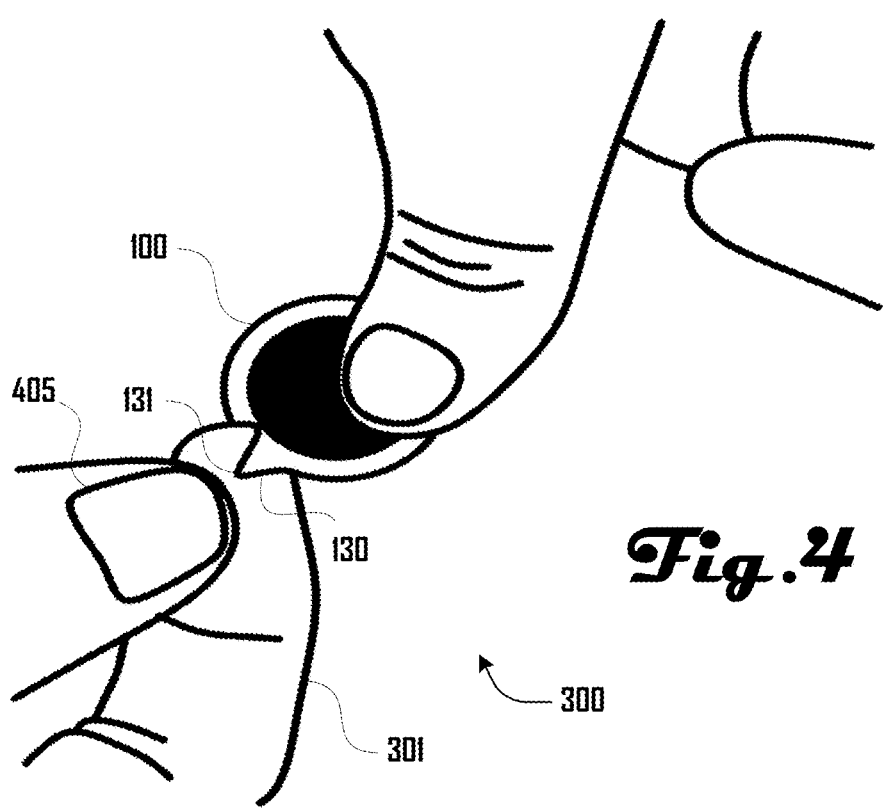
FIG. 4 illustrates a perspective view of a user removing a mounting sticker from a wall by peeling the mounting sticker at a peeling tip.

As discussed herein, the mounting sticker 100 can be removable and reusable. For example, FIG. 4 illustrates a mounting sticker 100 being removed from a wall 300 by a user 301 lifting the point 131 of the peeling tip 130 from the wall with a fingernail 405 and using the peeling tip 130 to lift the head portion 125 of the mounting sticker 100 from the wall 300. Accordingly, in some embodiments, having a peeling tip 130 with an acute point 131 can be desirable because it can provide position where a user 301 can begin peeling the mounting sticker 100 from the wall.

The mounting sticker 100 can be configured for ease in peeling off a surface. For example, the example embodiment of FIGS. 1*a-c* can be desirable where adhesive is present on substantially all portions of the sticker body 110 defining the rear side and where the sticker body 110 comprises a flexible material such as a fabric and where the magnetically receptive member 120 comprises a rigid material such as metal and is non-adhesive. In such an example, a user can peel the mounting sticker beginning with the point 131 of the peeling tip 130 until reaching the magnetically receptive member 120. At this point, the rigid magnetically receptive member 120 can be used to lift the head portion 125 off the surface, with the non-adhesive face of the magnetically receptive member 120 preventing undue suction or adhesion to the surface. Accordingly such a configuration can provide for ease in peeling off a surface within a relatively constant range of peeling force due to a substantially consistent range of surface area being peeled at a given time during the peeling-of process.

Additionally, having a magnetically receptive member 120 of a circular shape can be desirable because it can provide for easier peeling from a surface due to lack of linear edges and the curved peeling profile generated by the circular magnetically receptive member 120 during peeling process discussed herein. Similarly, a circular portion of the head portion 125 can also provide for similar beneficial peeling capabilities. Further peeling benefits can result from the correspondence of the circular shape of the magnetically receptive member 120, circular shape of a circular portion of the head portion 125 and a consistent distance therebetween as discussed herein.

Figure 5:
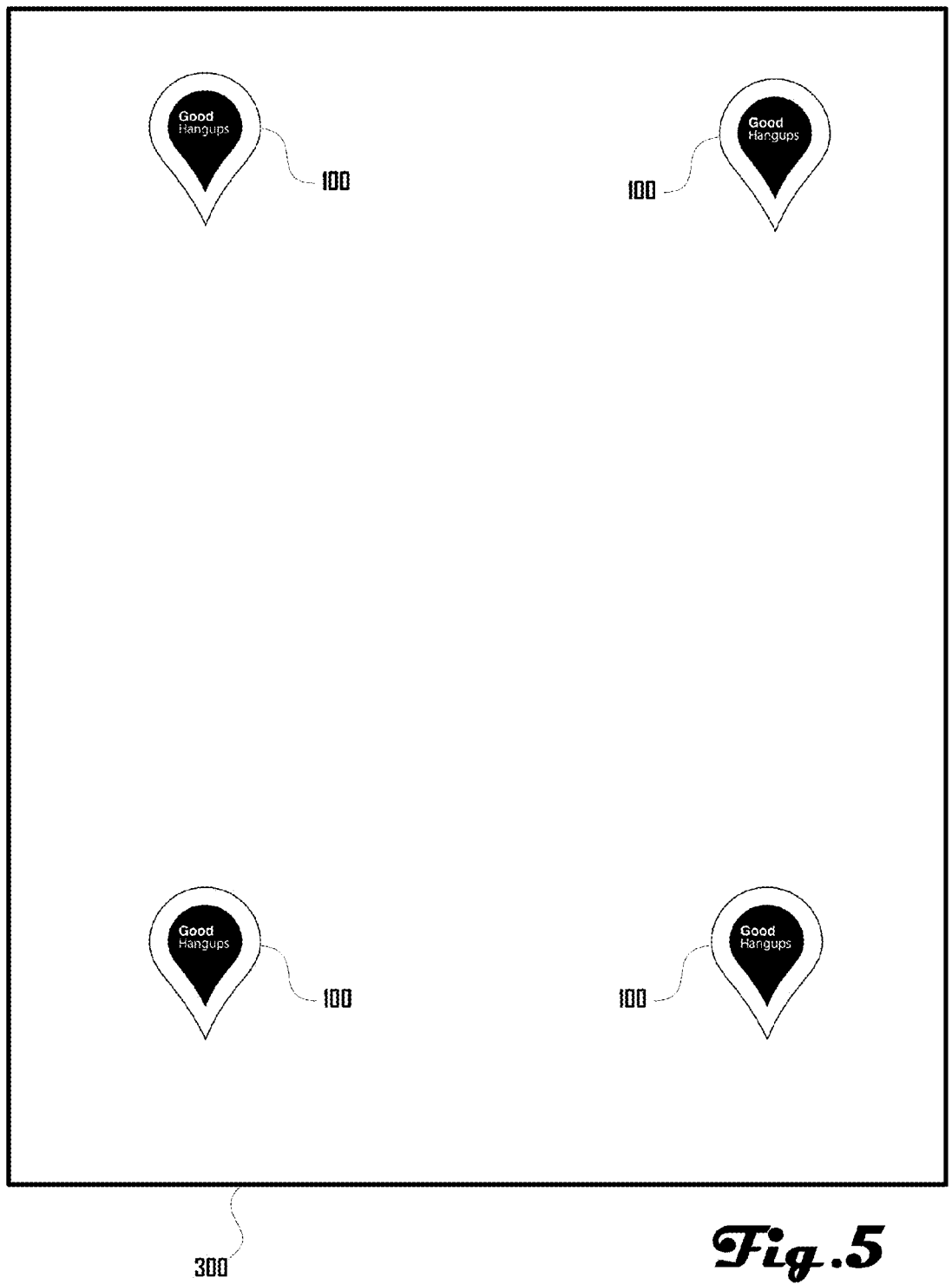
FIG. 5 illustrates an example of mounting a hanging item to a wall by sticking a plurality of mounting stickers to the surface of the wall.
Figure 6:
FIG. 6 illustrates a further step in the example of FIG. 5, where a hanging item has been placed over the plurality of mounting stickers with magnets placed over each of the respective mounting stickers.

FIGS. 5 and 6 illustrate an example embodiment wherein a plurality of mounting stickers 100 and magnets 320 are used to couple a hanging item 310 to a wall 300. As shown in FIG. 5, four mounting stickers 100 can be stuck to a wall 300 in a generally rectangular configuration. Turning to FIG. 6, a handing item 310 can be positioned over and covering the mounting stickers 100 and respective magnets 320 can be used to respectively couple the portions of the hanging item 310 between the magnet 320 and the mounting stickers 100. In other words, the hanging item 310 can be mounted on the wall 300 via attraction of the respective magnets 320 and the magnetically receptive member 120 of the respective mounting stickers 100.

Such a method of coupling a hanging item 310 to a wall 300 can be desirable for various reasons. For example, such a hanging system can be configured for removability such that the hanging item 310, magnets 320 and mounting stickers 100 leave no trace or marks on the wall when removed. In another example, the hanging item 310 may be easily leveled by moving the hanging item 310 within the coupling between the magnets 320 and mounting stickers 100, which can provide a movable coupling.

Figure 7:
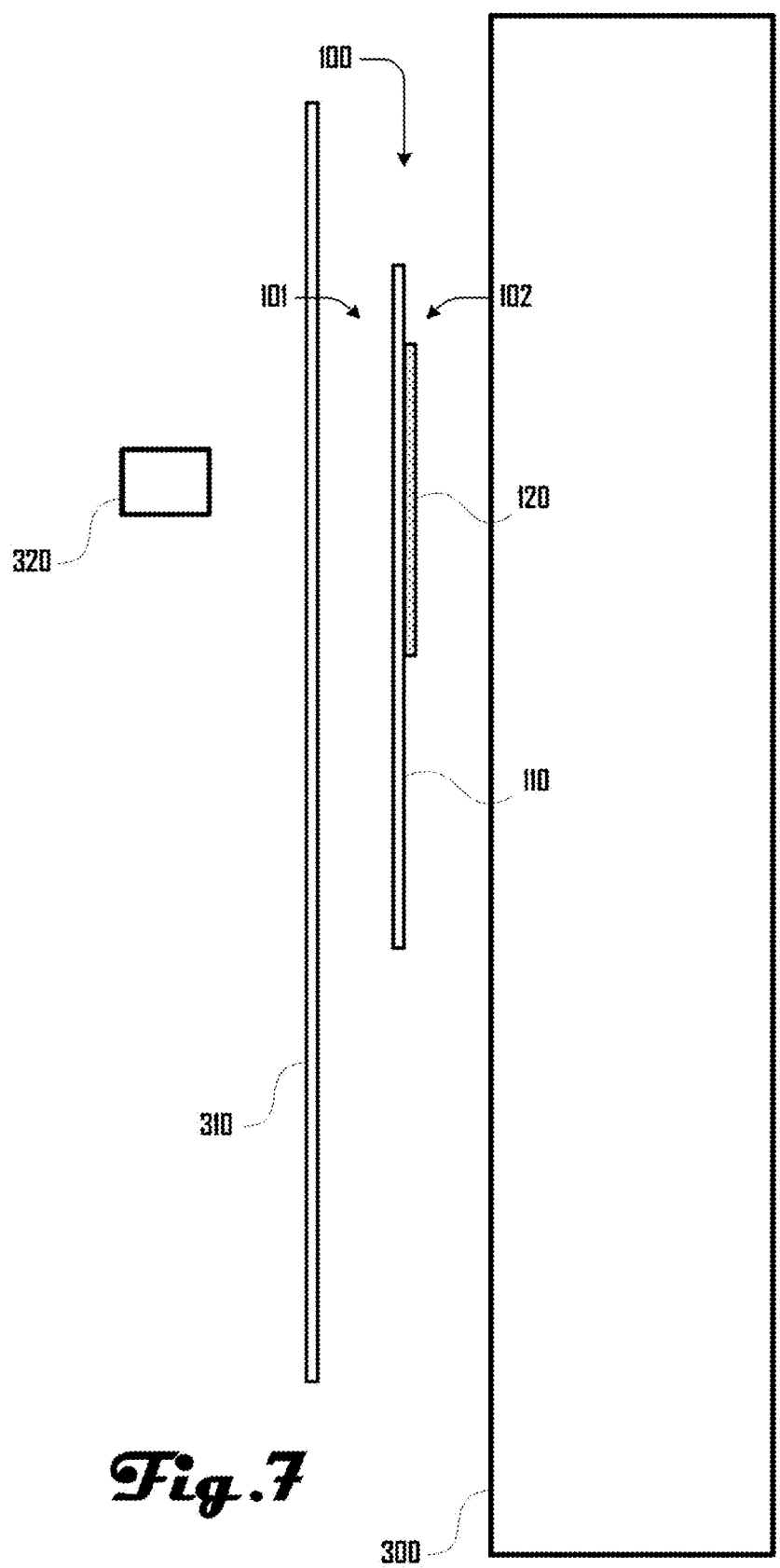
FIG. 7 illustrates a side view of an example embodiment of coupling a hanging item to a wall with a mounting sticker and a magnet.

FIG. 7 illustrates a side exploded view of one embodiment of how a hanging item 310 can be mounted to a wall 300 via a mounting sticker 100 and a magnet 320. As shown in this example, the mounting sticker 100 can be stuck to the wall 300 via the rear side 102 with the magnetically receptive member 120 facing the wall 300 and adhesive of the rear side 102 coupling the mounting sticker 100 to the wall 300. The hanging item 310 can be positioned over and abutting the front face 101 of the mounting sticker 100. The magnet 320 can be positioned over the magnetically receptive member 120, and the magnetic attraction between the magnet 320 and magnetically receptive member 120 can pinch the hanging item 310 between the mounting sticker 100 and the magnet 320.

Although some example embodiments illustrated herein include thin planar hanging items 310 such as posters, cards, or the like, it should be clear that various suitable hanging items 310 can be mounted to a wall 300. Additionally, although some example embodiments illustrated herein depict mounting hanging items 310 on a wall 300, it should be clear that the systems and methods described and shown herein can be used on any suitable surface, including brick, concrete, textured walls, painted walls, glass, fabric, the interior of a vehicle, furniture, a computer monitor, a stainless steel refrigerator, and the like.

Furthermore, in addition to mounting to vertical surfaces such as a wall 300, it should be clear that the systems and methods described and shown herein can be used on surfaces of any suitable angle, orientation, or the like, including a ceiling, table top, counter top, vehicle dashboard, floor, or the like. Also, while flat surfaces are illustrated in various embodiments, mounting stickers 100 can be configured to be coupled on non-flat surfaces. For example, the mounting sticker 100 can be flexible such that the mounting sticker 100 can be coupled to rounded surfaces or objects.

Figure 8:
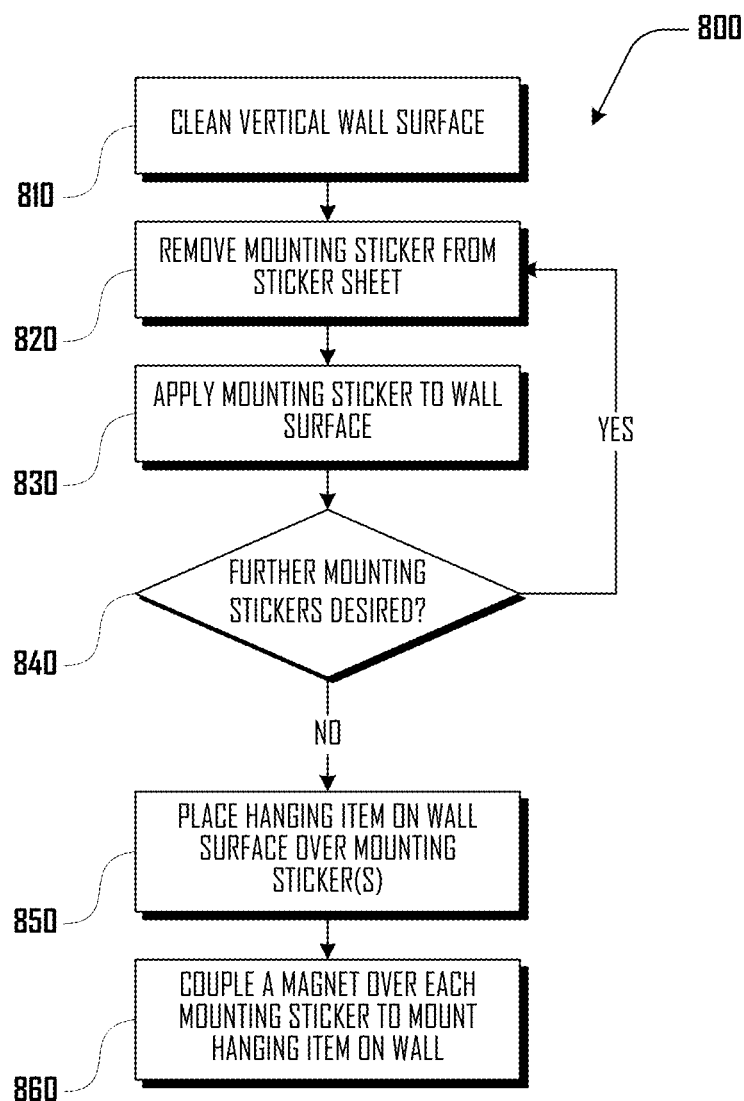
FIG. 8 is a block diagram of a method of mounting a hanging item to a wall with one or more mounting sticker and one or more magnet.

FIG. 8 is a block diagram of a method 800 for coupling a hanging item 310 to a wall 300 using one or more mounting stickers 100 and one or more magnets 320. The method 800 begins, at 810, where a surface of a vertical wall 300 is cleaned and a mounting sticker 100 is removed from a sticker sheet 200, at 820. At 830, the mounting sticker 100 is applied to the surface of the wall 300, and at 840, a determination is made whether further mounting stickers are desired. If so, the method 800 cycles back to 820 where a further mounting sticker 100 is removed from the sticker sheet 200. However, if at 840, a determination is made that a further mounting sticker 100 is not desired, the method 800 continues to 850, where a hanging item is placed on the wall 300 over the one or more mounting stickers 100 that have been stuck to the wall 300. At 860, a magnet 320 is coupled over each mounting sticker 100 to mount the hanging item 310 to the wall 300.

Figure 9:
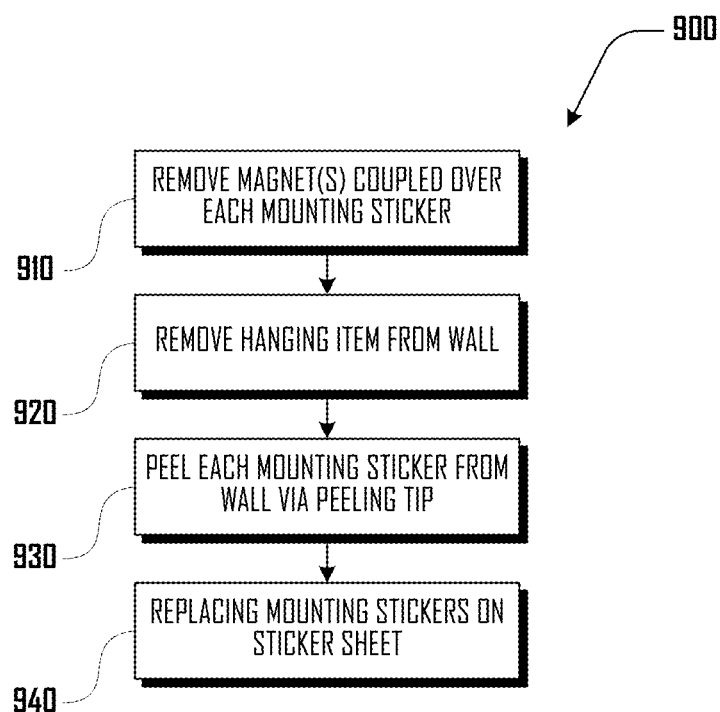
FIG. 9 is a block diagram of a method of de-mounting a hanging item from a wall, which has been mounted to the wall via one or more mounting sticker and one or more magnet.

FIG. 9 illustrates a method 900 of dismounting a hanging item 310 from a wall 300 where the hanging item 310 has been coupled to the wall 300 via one or more mounting stickers 100 and one or more magnets 320. The method begins, at 910, where one or more magnets 320 coupled over one or more mounting sticker 100 are removed, and at 920, the hanging item 310 is removed from the wall 300. At 930, each mounting sticker 100 is peeled from the wall 300 via the peeling tip 130, and at 940, the one or more mounting stickers are replaced on the sticker sheet 200.

Although various examples illustrate a mounting sticker 100 having a teardrop shape and a single flat circular magnetically receptive member 120, in further embodiments, a mounting sticker 100 can be configured in various suitable alternative ways. For example, in further embodiments, the sticker body 110 and/or magnetically receptive member 120 can be any suitable shape, including a circle, square, triangle, oval, pear-shape, star, or other regular or irregular shape.

Figure 11:
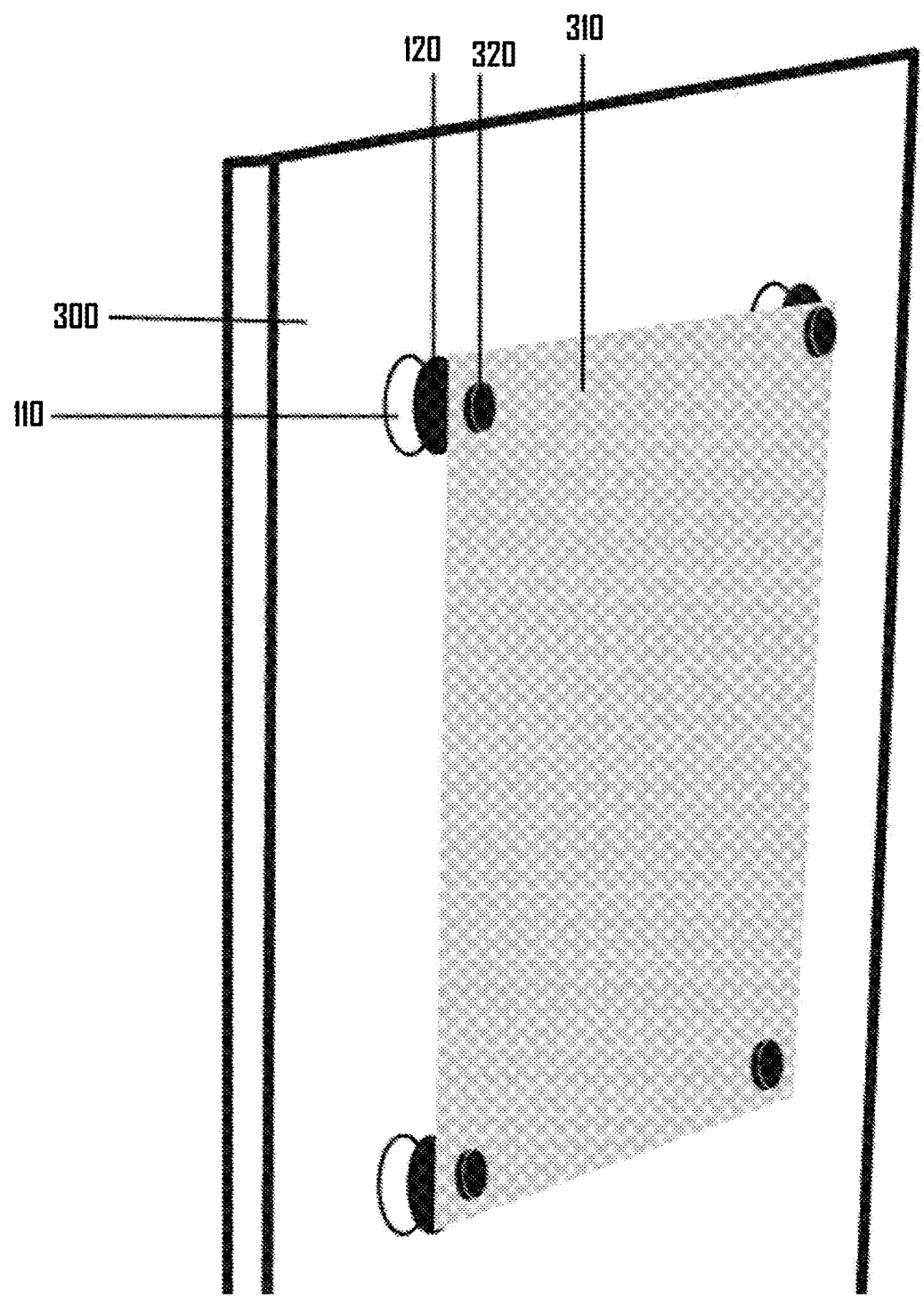
FIG. 11 illustrates a magnetic mounting system that comprises a circular mounting sticker that includes a flat circular magnetically receptive member and a circular sticker body.

For example, FIG. 11 illustrates a magnetic mounting system that comprises a circular mounting sticker 100 that includes a flat circular magnetically receptive member 120 and a circular adhesive body or sticker body 110. More specifically, FIG. 11 shows an example of how a poster 310 could be displayed with the magnetic hanging system. The removable and circular sticker body 110 adheres to the magnet or magnetic receptive material 120 to form the circular mounting sticker 100 that adheres to the wall 300. In this example, four mounting stickers 100 are placed on the wall where the corners of the poster will be. Then the poster 310 is placed over the mounting sticker 100 and then a magnet 320 is placed on top to hold the poster 310 in place.

Additionally, the sticker body 110 and/or magnetically receptive member 120 can be any suitable size and although some example embodiments herein are illustrated having a specific size relative to a human hand, other embodiments can be smaller or larger as desired.

Additionally, although various embodiments illustrate a magnetically receptive member 120 coupled on the rear side 102 of the sticker body 110, in further embodiments, a magnetically receptive member 120 can be coupled to or otherwise associated with a sticker body 110 in various suitable ways. For example, in one embodiment, a sticker body 110 can comprise an orifice, slot, or the like, in which a magnetically receptive member 120 can reside. In a further embodiment, a magnetically receptive member 120 can be sandwiched between a first and second layer of sticker bodies 110.

Figure 10A:
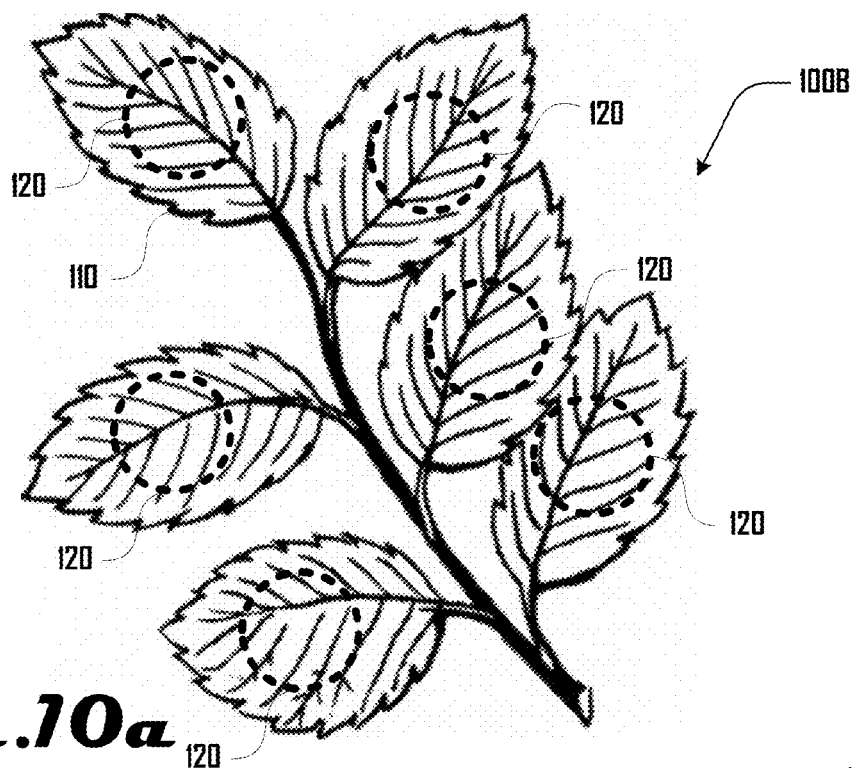
FIG. 10a illustrates an example embodiment of a mounting sticker having a shape and graphic of leaves with a plurality of magnetically receptive members disposed at the leaves.

In further embodiments, a mounting sticker 100 can comprise a plurality of magnetically receptive members 120. For example, FIG. 10*a* illustrates one example embodiment where the sticker body 110 includes a graphic of leaves and stems and is generally in the shape of leaves and stems. As illustrated in the example of FIG. 10*a* a plurality of magnetically receptive members 120 are positioned at the leaves.

A still further example embodiment includes a calendar made of whiteboard material (or other suitable material) having magnetically receptive members 120 in boxes corresponding to days of the week. Another embodiment includes a map having magnetically receptive members 120 in states or countries defined by the map. One embodiment can include artistic works having magnetically receptive members 120. A further embodiment can include a wall puzzle having magnetically receptive members 120 and magnets 320 in puzzle pieces. A still further embodiment includes a children's growth chart including magnetically receptive members 120 at positions to hang pictures of a child as he or she grows.

Additionally, although various example embodiments herein illustrate a cylindrical magnet 320, further embodiments can include magnets 320 of any suitable size and shape. In still further embodiments, magnets 320 can be associated with various functional and/or decorative elements. For example, some embodiments include a button body having a magnet 320 disposed therein. In further embodiments, a magnet 320 can be coupled to various suitable sculptural elements (e.g., a butterfly, or the like). In still further embodiments, functional elements can be associated with a magnet 320 including a hook, loop, clip, box, Velcro, clock, key ring, vase, adhesive, framing element, or the like.

Figure 10B:
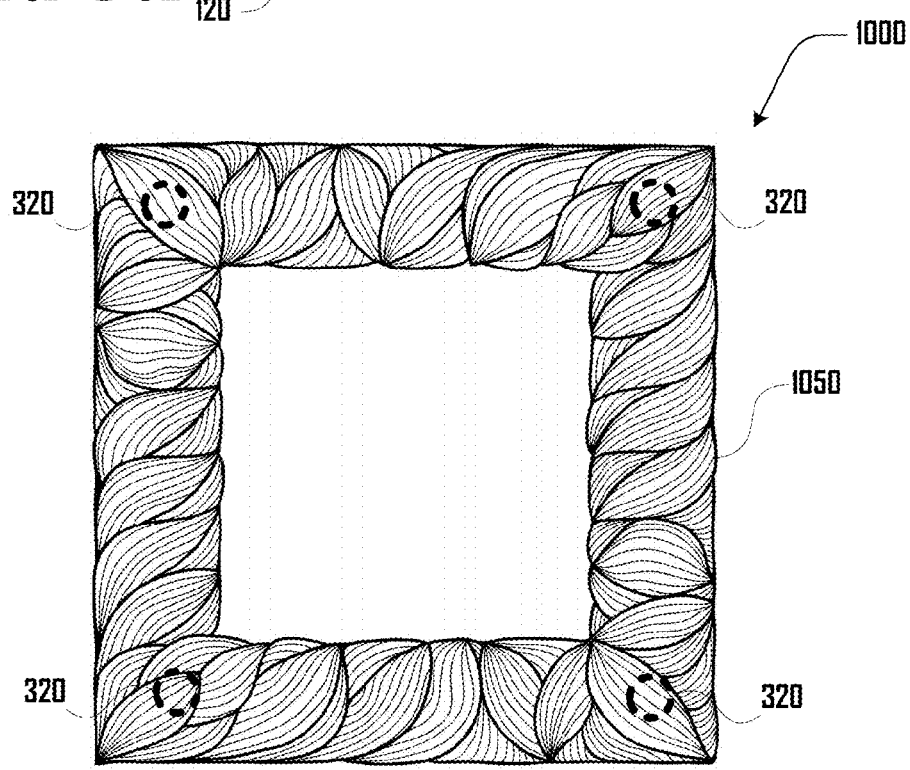
FIG. 10b illustrates an example embodiment of a frame architecture comprising a frame body having a plurality of magnets disposed therein and defining a frame opening.

Additionally, in further embodiments, a plurality of magnets 320 can be present in single body. For example, FIG. 10*b* illustrates a frame architecture 1000 comprising a frame body 1050 having a plurality of magnets 320 disposed therein and defining a frame opening 1060. Such an embodiment can be used to mount a picture or poster to a wall 300 while also framing the picture or poster.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A method of mounting a hanging item to a wall comprising:
   sticking a mounting sticker to a surface of a wall, the mountings sticker consisting of:
      a non-adhesive front side defined by a planar sticker body having a circular head portion with a single peeling tip extending from the head portion and terminating at a point defined by an acute angle; and
      a rear side defined by the planar sticker body and including a planar magnetically receptive member disposed thereon with the magnetically receptive member completely peripherally surrounded by a portion of the sticker body, at least a portion of the sticker body defining the rear side comprising an adhesive,
      wherein the mounting sticker is stuck to the surface of the wall via the adhesive with the rear side abutting the wall;
   positioning a hanging item over the mounting sticker and abutting the wall; and
   mounting the hanging item to the wall by positioning a magnet over the hanging item and over the magnetically receptive member such that magnetic attraction between the magnet and magnetically receptive member securely couples the hanging item between the magnet and the mounting sticker;
   dismounting the hanging item from the wall by removing the magnet coupled over the hanging item and mounting sticker; and
   removing the mounting sticker from the surface of the wall beginning by peeling the mounting sticker beginning with the point.

2. The method of claim 1 further comprising:
   sticking a plurality of mounting stickers to the surface of the wall;
   positioning the hanging item over the plurality of mounting stickers and abutting the wall; and
   mounting the hanging item to the wall by positioning respective magnets over the hanging item and over the respective magnetically receptive members such that magnetic attraction between the respective magnets and magnetically receptive members couples the hanging item between the magnets and the mounting stickers.

3. The method of claim 1, wherein the magnetically receptive member is circular and centrally disposed on the head portion with an outer edge of magnetically receptive member being offset from an outer edge of the sticker body at a constant distance from a circular edge of the head portion.

4. The method of claim 3, wherein a radius of the magnetically receptive member is greater than the constant distance from the circular edge of the head portion.

5. The method of claim 1,
   wherein the magnetically receptive member is rigid; and
   wherein removing the mounting sticker from the surface of the wall comprises peeling the mounting sticker, beginning with the point, until reaching the magnetically receptive member and then using the magnetically receptive member to lift the head portion off the surface.

6. A mounting sticker consisting of:
a non-adhesive front side defined by a planar sticker body that defines a head portion with a single peeling tip extending from the head portion, the peeling tip configured for removing the mounting sticker from a surface of a wall beginning by peeling the mounting sticker beginning with and end of the peeling tip; and
a rear side defined by the planar sticker body and including a planar magnetically receptive member disposed thereon with the magnetically receptive member completely peripherally surrounded by a portion of the sticker body, at least a portion of the sticker body defining the rear side comprising an adhesive.

7. The mounting sticker of claim 6, wherein the peeling tip extends from the head portion and terminates at a point.

8. The mounting sticker of claim 6, wherein the peeling tip extends from the head portion and defines an acute angle.

9. The mounting sticker of claim 6, wherein the head portion is circular.

10. The mounting sticker of claim 6, wherein the magnetically receptive member is circular and centrally disposed on the head portion with an outer edge of magnetically receptive member being offset from an outer edge of the sticker body at a constant distance from a circular edge of the head portion.

11. The mounting sticker of claim 10, wherein a radius of the receptive member is greater than the constant distance from the circular edge of the head portion.

12. The mounting sticker of claim 6, wherein the entire portion of the sticker body defining the rear side comprises the adhesive.

13. The mounting sticker of claim 6, wherein a face of the magnetically receptive member that defines the rear side is non-adhesive.

14. A sticker sheet comprising a plurality of the mounting stickers of claim 6 stuck thereon via respective adhesive with the respective rear sides of the mounting stickers abutting the sticker sheet.

15. A magnetic mounting system comprising:
a plurality of mounting stickers that each consist of:
an adhesive front side defined by a circular planar adhesive body that defines a circular head portion, with at least a portion of the adhesive body defining the adhesive front side comprising an adhesive;
an adhesive rear side defined by the circular planar adhesive body, with at least a portion of the adhesive body defining the adhesive rear side comprising an adhesive; and
a circular planar magnetically receptive disc disposed on the adhesive rear side of the circular planar adhesive body.

16. The magnetic mounting system of claim 15, wherein a radius of the circular planar magnetically receptive disc corresponds to, and is equidistant from, a circular edge portion of the circular planar adhesive body.

17. The magnetic mounting system of claim 15, wherein the magnetically receptive disc is non-magnetic.

18. The magnetic mounting system of claim 15, further comprising a plurality of magnets configured to couple with the magnetically receptive discs of the mounting stickers.

19. The magnetic mounting system of claim 15, wherein the circular planar adhesive body and the circular planar magnetically receptive disc have substantially the same radius.

20. A method of mounting a hanging item to a wall comprising:
sticking two or more mounting stickers of claim 15 to a surface of a wall;
positioning a hanging item over the mounting stickers and abutting the wall; and
mounting the hanging item to the wall by positioning a respective magnet over the hanging item and over the respective magnetically receptive members of the mounting stickers such that magnetic attraction between the magnet and magnetically receptive members securely couples the hanging item between the respective magnets and the mounting stickers;
dismounting the hanging item from the wall by removing the magnets coupled over the hanging item and mounting stickers; and
removing the mounting stickers from the surface of the wall by peeling the mounting stickers beginning with an edge of the mounting stickers.

\* \* \* \* \*